US010783101B1

(12) United States Patent
Kamiya et al.

(10) Patent No.: US 10,783,101 B1
(45) Date of Patent: Sep. 22, 2020

(54) METHODS AND SYSTEM FOR COMMUNICATION BETWEEN A HOST DEVICE AND SLAVE DEVICES

(71) Applicant: SEMICONDUCTOR COMPONENTS INDUSTRIES, LLC, Phoenix, AZ (US)

(72) Inventors: Tomonori Kamiya, Ichinomiya (JP); Yukihito Takeda, Kakamigahara (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/453,022

(22) Filed: Jun. 26, 2019

(51) Int. Cl.
*G06F 13/20* (2006.01)
*G06F 13/16* (2006.01)
*G06F 13/42* (2006.01)

(52) U.S. Cl.
CPC .......... *G06F 13/20* (2013.01); *G06F 13/1668* (2013.01); *G06F 13/4282* (2013.01); *G06F 2213/0016* (2013.01)

(58) Field of Classification Search
None
See application file for complete search history.

(56) References Cited

U.S. PATENT DOCUMENTS 7,587,539 B2 * 9/2009 Picard ................. G06F 13/4291 710/104
8,502,153 B2 * 8/2013 Wong ...................... G01S 7/497 250/341.1
8,943,256 B1 * 1/2015 Landry ................. G06F 13/404 710/300
9,798,684 B2 * 10/2017 Poulsen .............. G06F 13/4291
10,198,382 B2 * 2/2019 Danis ....................... G06F 13/24
10,382,687 B1 * 8/2019 Patel .................... G02B 27/646
10,420,058 B2 * 9/2019 Bitar ..................... H04L 41/085
2007/0250648 A1 * 10/2007 Picard ................. G06F 13/4291 710/9
2008/0098144 A1 4/2008 Rees
2008/0246723 A1 * 10/2008 Baumbach .......... G06F 3/03547 345/156
2011/0121182 A1 * 5/2011 Wong ...................... G01S 17/04 250/340
2012/0327293 A1 * 12/2012 Ollila ....................... G02B 7/36 348/362
2016/0314087 A1 * 10/2016 Poulsen .............. G06F 13/4291
2017/0134216 A1 * 5/2017 Bitar ................... H04W 64/003
2018/0088218 A1 * 3/2018 Kawasaki ............. G01S 7/4913
2019/0242730 A1 * 8/2019 Croke .................... G01D 21/00
2019/0261473 A1 * 8/2019 Cala' ..................... H05B 45/37

* cited by examiner

*Primary Examiner* — Steven G Snyder
(74) *Attorney, Agent, or Firm* — The Noblitt Group, PLLC; Hettie L. Haines

(57) ABSTRACT

Various embodiments of the present technology may provide methods and system for communication between a host device and slave devices. The system may provide a plurality of integrated circuits (i.e., slave devices) connected to and configured to communicate with a host device (i.e., a master device). Each integrated circuit may provide a register to store a unique slave address, a global slave address, and an order number. The host device may communicate with each slave device individually using the unique slave address and communicate with all slave devices simultaneously using the global slave address and the order number.

20 Claims, 6 Drawing Sheets

100 105 HOST DEVICE (MASTER DEVICE) SDA SCL 130 I/F 115 EEPROM INTERNAL REGISTERS 150 FIRST SLAVE ADDRESS 155 SECOND SLAVE ADDRESS IC ORDER # 160 OTHER OTHER 120 IC 1 110(1) 165 LOCATION INFO 170 ACTUATOR INFO LOCATION SENSOR 140 ACTUATOR DRIVER 145(1) 175 IC 2 110(2) 145(2) IC 3 110(3) 145(3) IC 4 110(4) 145(4)

METHODS AND SYSTEM FOR COMMUNICATION BETWEEN A HOST DEVICE AND SLAVE DEVICES

BACKGROUND OF THE TECHNOLOGY

Figure 6:
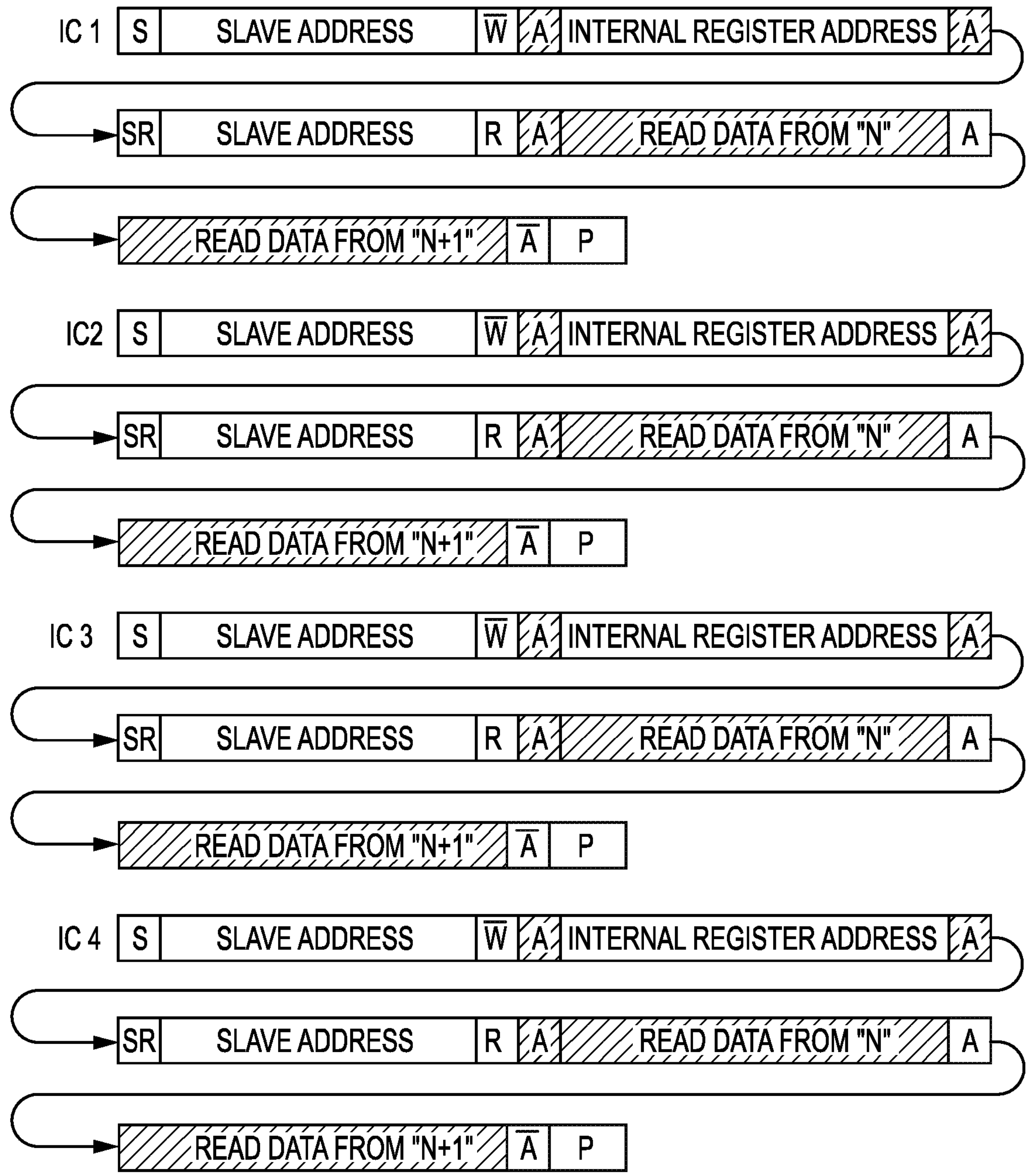
Figure 7:
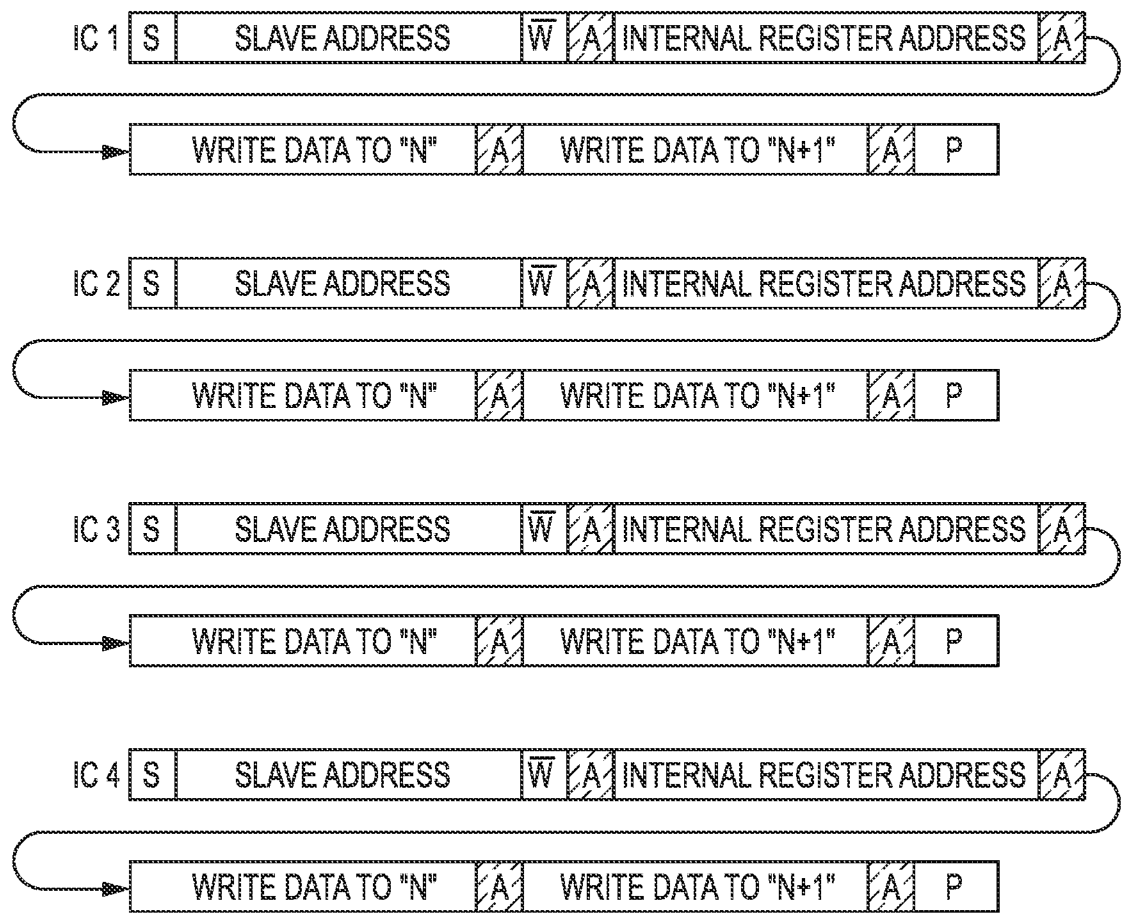

Many systems require multiple slave devices that are controlled by a single host device (i.e., master device). In some cases, the slave devices are substantially identical to each other, for example the slave devices are physically identical but each slave device has an address that is different from the other slave devices. In conventional systems, the host device communicates with each slave device individually using a different slave address for each slave device. This typically requires the host device to perform a number of reading and writing transactions with each slave device. In some cases, the host device may perform the same reading and writing transactions with each slave device using the respective slave address for each slave device, for example as illustrated in FIGS. 6 and 7. Individual communication with each slave device increases the amount of data that is transmitted for the reading and writing transactions, which may diminish the overall data transfer rate.

SUMMARY OF THE INVENTION

Various embodiments of the present technology may provide methods and system for communication between a host device and slave devices. The system may provide a plurality of integrated circuits (i.e., slave devices) connected to and configured to communicate with a host device (i.e., a master device). Each integrated circuit may provide a register to store a unique slave address, a global slave address, and an order number. The host device may communicate with each slave device individually using the unique slave address and communicate with all slave devices simultaneously using the global slave address and the order number.

BRIEF DESCRIPTION OF THE DRAWING FIGURES

A more complete understanding of the present technology may be derived by referring to the detailed description when considered in connection with the following illustrative figures. In the following figures, like reference numbers refer to similar elements and steps throughout the figures.

Figure 1:
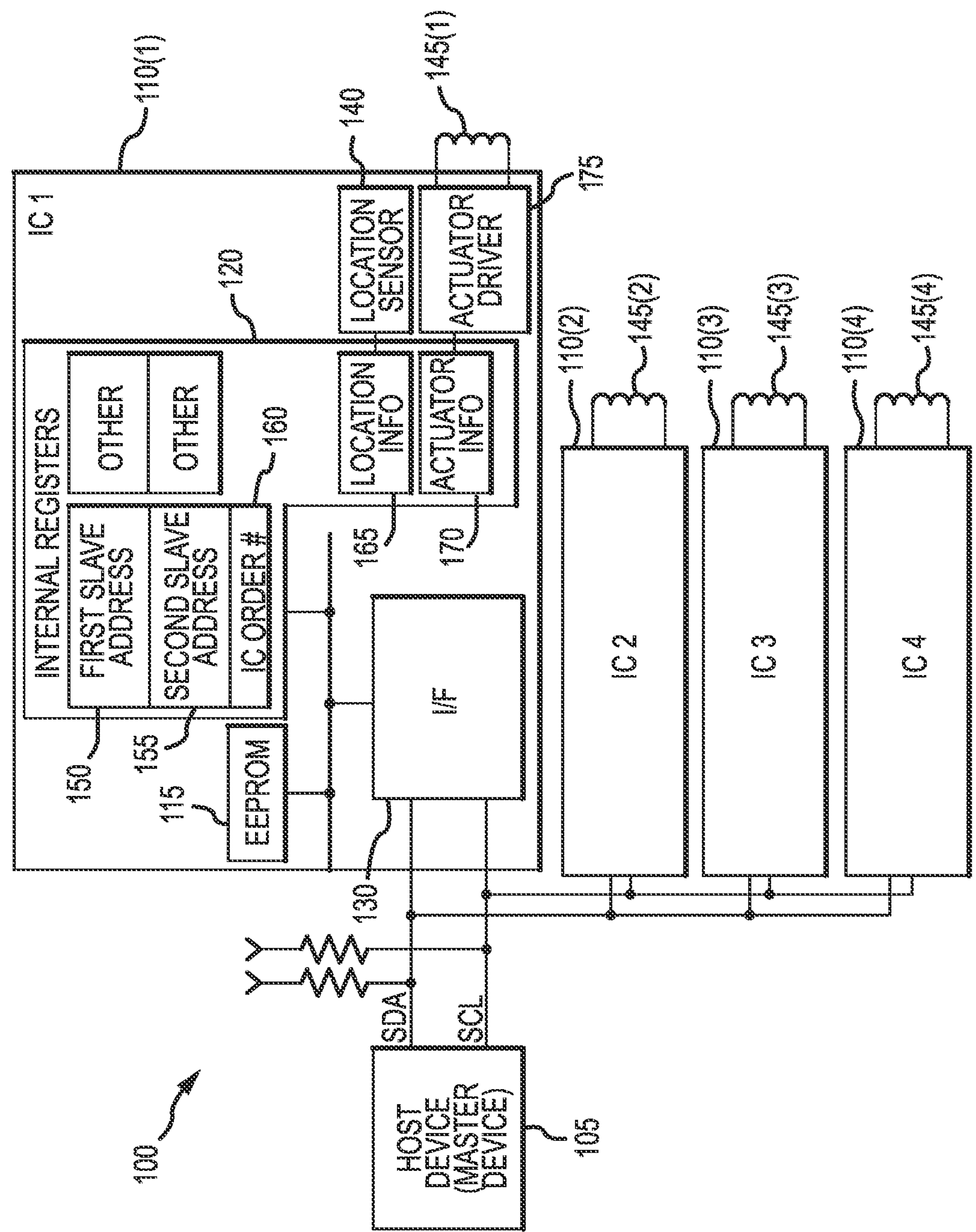
Figure 2:
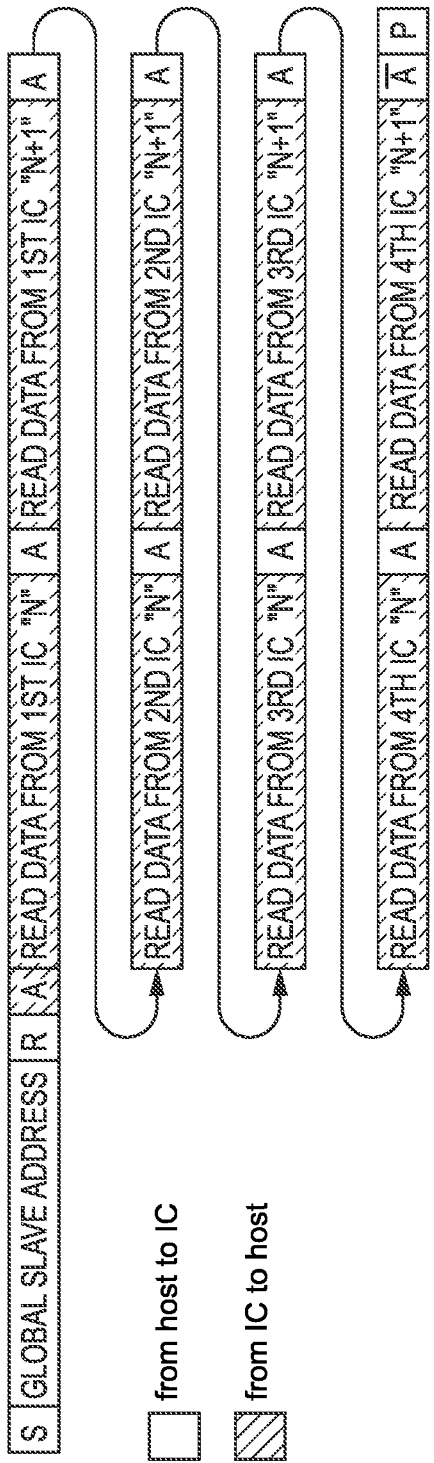
Figure 3:
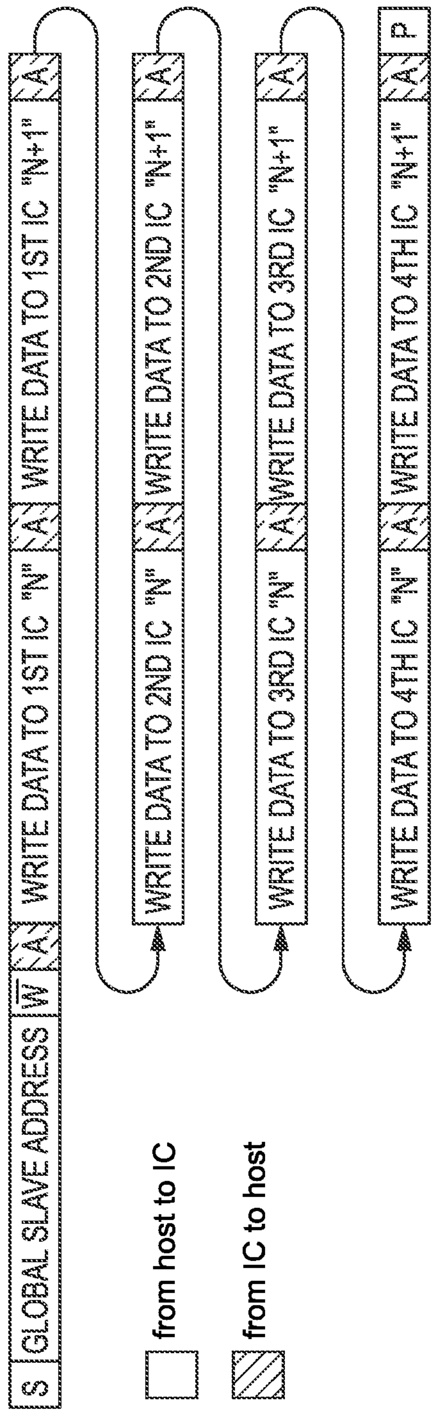
Figure 4:
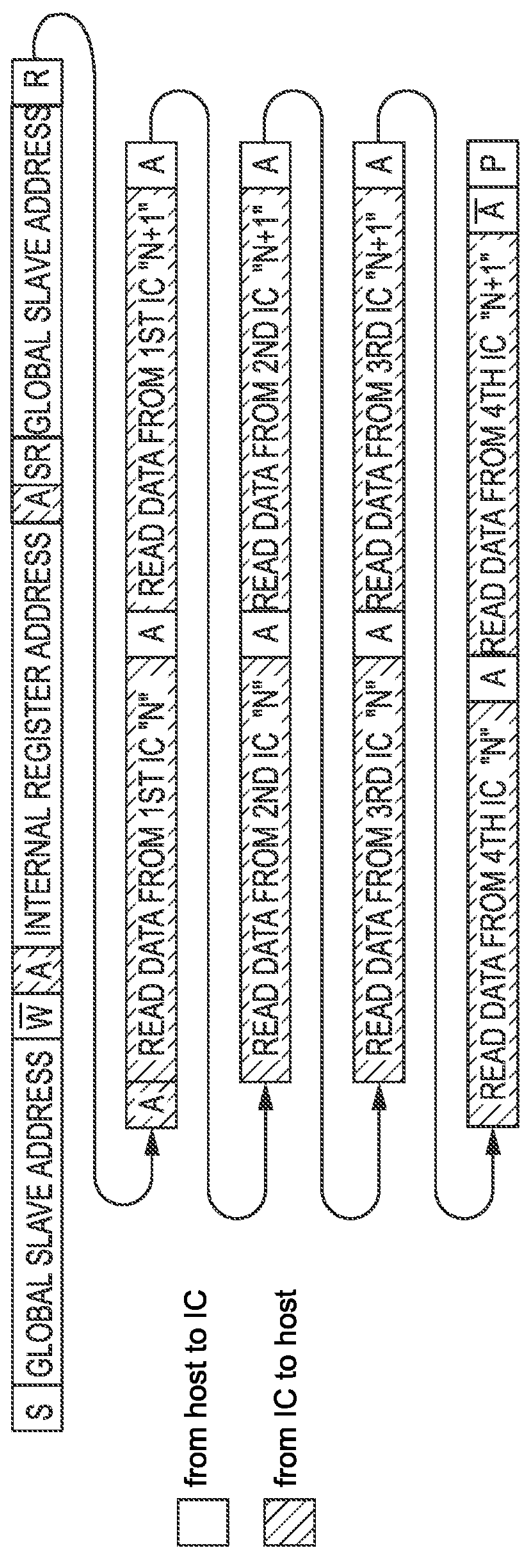
Figure 5:
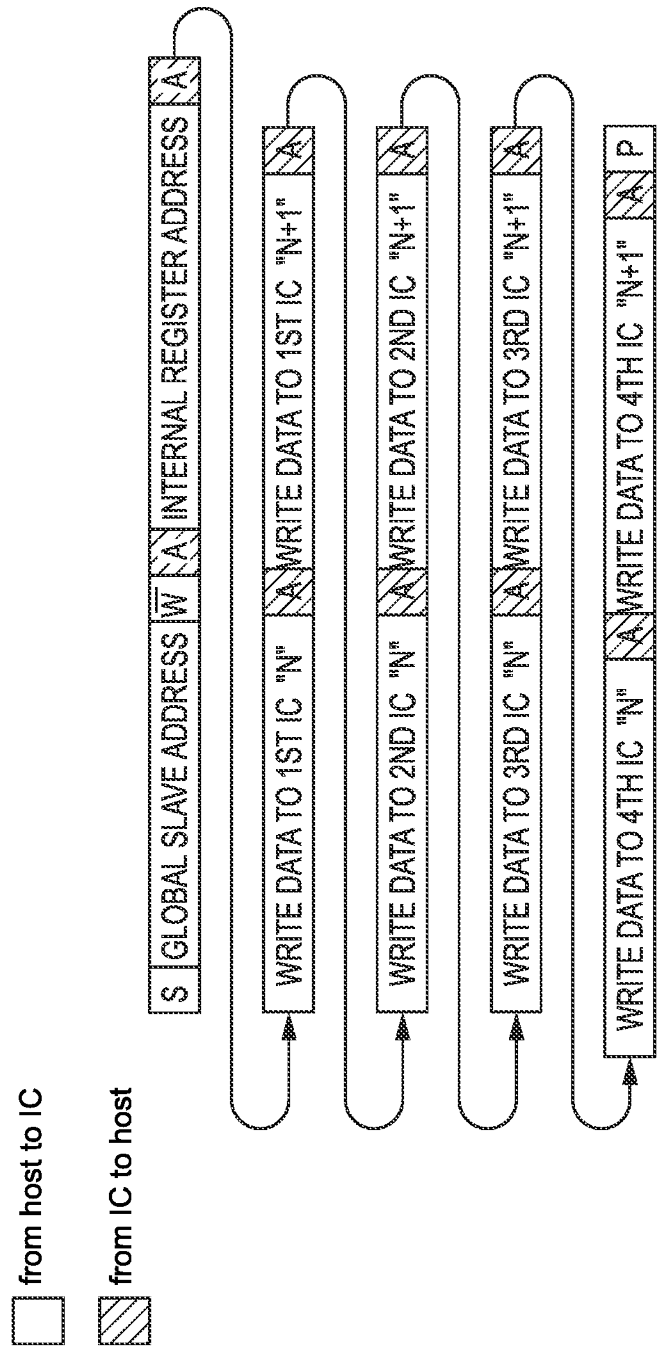

FIG. 1 representatively illustrates a system in accordance with an exemplary embodiment of the present technology;

FIG. 2 representatively illustrates a reading transaction in accordance with an exemplary embodiment of the present technology;

FIG. 3 representatively illustrates a writing transaction in accordance with an exemplary embodiment of the present technology;

FIG. 4 representatively illustrates an alternative reading transaction in accordance with an exemplary embodiment of the present technology;

FIG. 5 representatively illustrates an alternative writing transaction in accordance with an exemplary embodiment of the present technology;

FIG. 6 representatively illustrates reading transactions of a conventional system; and FIG. 7 representatively illustrates writing transactions of a conventional system.

DETAILED DESCRIPTION OF EXEMPLARY EMBODIMENTS

The present technology may be described in terms of functional block components and various processing steps. Such functional blocks may be realized by any number of components configured to perform the specified functions and achieve the various results. For example, the present technology may employ various controllers, amplifiers, signal converters, switching devices, current sources, voltage sources, logic gates, memory devices, semiconductor devices, such as transistors, capacitors, and the like, which may carry out a variety of functions. In addition, the present technology may be integrated in any number of electronic systems, such as automotive, aviation, "smart devices," portables, and consumer electronics, and the systems described are merely exemplary applications for the technology.

Referring to FIG. 1, an exemplary system 100 may be integrated in an electronic device (not shown), such as a camera, a cell phone, laptop computer, and the like to provide communication and functionality between various components. According to an exemplary embodiment, the system 100 may comprise a host device 105 (i.e., a master device), such as a microcontroller, and a plurality of integrated circuits (i.e., slave devices), such as a first integrated circuit 110(1), a second integrated circuit 110(2), a third integrated circuit 110(3), and a fourth integrated circuit 110(4), wherein the integrated circuits are substantially identical. For example, the first, second, third, and fourth integrated circuits 110(1), 110(2), 110(3), 110(4) may be physically identical (i.e., identical hardware), but each integrated circuit may be programmed with an address that is different from the addresses of the other integrated circuits.

In various embodiments, each integrated circuit (IC) 110 may communicate with the host device 105 via a communication bus comprising a data line SDA and a clock line SCL. In various embodiments, the data line SDA transmits data signals between the host device 105 and each integrated circuit 110, and the clock line SCL transmits a clock signal from the host device 105 to each integrated circuit 110. According to an exemplary embodiment, the system 100 is configured as an $I^2C$ (Inter-integrated Circuit) and may comprise a serial computer bus. Accordingly, the data line SDA may be referred to as a serial data line and the clock line SCL may be referred to as a serial clock line.

Each integrated circuit 110 may be configured to receive and transmit various data signals from/to the host device 105 and to receive a clock signal from the host device 105. For example, each integrated circuit 110 may comprise a data terminal connected to the data line SDA and configured to communicate data signals, and a clock terminal connected to the clock line SCL. In various embodiments, each integrated circuit 110 may be configured as a large-scale integrated circuit (LSI).

According to an exemplary embodiment, each integrated circuit 110 may comprise an interface circuit 130 configured to communicate directly with the host device 105 via the data and clock lines SDA, SCL.

Each integrated circuit 110 may further comprise a plurality of internal registers 120 to store various data, wherein each internal register is associated with a particular address. For example, each integrated circuit 110 may comprise a first register 150, from the plurality of internal registers 120, to store a first slave address (i.e., a unique address), wherein the first slave address is an address that is unique to a particular integrated circuit 110. In other words, each integrated circuit 110 has a first slave address that is different from the other integrated circuits 110.

In addition, each integrated circuit 110 may comprise a second register 155, from the plurality of internal registers 120, to store a second slave address (i.e., a global address), wherein the second slave address is common to all the integrated circuits 110. In other words, all the integrated circuits 110 share the second slave address.

In addition, each integrated circuit 110 may comprise a third register 160, from the plurality of internal registers 120, to store an IC order (i.e., an order number), wherein the IC order for a particular integrated circuit 110 is different from the order number of the other integrated circuits 110.

According to an exemplary embodiment, each integrated circuit 110 may further comprise a memory 115. The memory 115 may be connected to the interface circuit 130 and/or the plurality of internal registers 120 and may be used to store the first and second slave addresses and the order number when the system 110 is powered down. For example, the memory 115 may comprise a non-volatile memory, such as an EEPROM (electrically erasable programmable read-only memory).

According to an exemplary embodiment, each integrated circuit 110 may be configured as a driver integrated circuit for controlling an actuator 145. Accordingly, each integrated circuit 110, from the plurality of integrated circuits, may communicate with and control a respective actuator 145. For example, each integrated circuit 110 may comprise a location sensor 140 to detect location or position information of the actuator 145. In one embodiment, the location sensor 140 may comprise a hall sensor. According to an exemplary embodiment, the plurality of internal registers 120 may comprise a fourth register 165 to store location information from the location sensor 140. For example, the fourth register 165 and/or the plurality of internal registers 120 may be connected to the location sensor 140.

Each integrated circuit 110 may further comprise an actuator driver 175 to generate a voltage or current to drive or otherwise move the actuator 145 to a desired position. According to an exemplary embodiment, the plurality of internal registers 120 may comprise a fifth register 170 to store actuator information used to control the actuator 145. For example, the fifth register 170 and/or the plurality of internal registers 120 may be connected to the actuator driver 175.

In operation, and referring to FIGS. 1-5, the host device 105 may communicate with each integrated circuit 110 separately or may communicate with all the integrated circuits 110(1):110(4) simultaneously. For example, the system 100 may be configured to perform a reading transaction, wherein the host device 105 reads data from one or more integrated circuits 110, and a writing transaction, wherein the host device 105 writes data to one or more integrated circuits 110. Each transaction may comprise a plurality of data transfers and each transaction may have a specified data rate based on a number of data bytes that are transferred to/from the host device 105. According to various embodiments, the data rate of the present system 100 may be improved over the data rates of a conventional communication methods. For example, in the conventional communication methods as illustrated in FIGS. 6 and 7, the reading transaction (FIG. 6) together with the writing transactions (FIG. 7) requires transferring 36 bytes of data.

Referring to FIGS. 1 and 2, and according to an exemplary embodiment, the host device 105 and the plurality of integrated circuits 110(1), 110(2), 110(3), 110(4) transfer a number of signals, such as data, address, and control signals, between each other. For example, the reading transaction may comprise a start condition (S), wherein the start condition may be defined as a change in the data signal, such as from a HIGH value to a LOW value. Each integrated circuit, such as the first, second, third, and fourth integrated circuits 110(1), 110(2), 110(3), 110(4), may detect the start condition.

The reading transaction may further comprise a global slave address signal, which the host device 105 sends to all the integrated circuits, such as the first, second, third, and fourth integrated circuits 110(1), 110(2), 110(3), 110(4). The global slave address signal corresponds to the global address stored in the second register 155. Since all of the integrated circuits 110(1), 110(2), 110(3), 110(4) have the same global address, all of the integrated circuits 110(1), 110(2), 110(3), 110(4) recognize the global address signal.

The reading transaction may further comprise a read signal (R), which the host device 105 sends to all the integrated circuits 110(1), 110(2), 110(3), 110(4).

The reading transaction may further comprise an acknowledgment signal (A), which each integrated circuit 110 sends to the host device 105 to acknowledge the start condition, the global slave address signal, and the read signal.

The reading transaction may further comprise reading particular data from each integrated circuit 110 in sequence based on the order number stored in the third register 160 of each integrated circuit 110. Accordingly, each integrated circuit 110 responds based on its particular order number. In an exemplary embodiment, the integrated circuit 110 with the lowest order number (lowest magnitude number) will respond first and the integrated circuit with the highest order number (highest magnitude number) will respond last. The integrated circuits 110 with intermediate order numbers will respond accordingly. For example, the host device 105 may read data from a register having an address "N" from the first integrated circuit 110(1) and immediately send an acknowledgment signal (A) to all the integrated circuit 110(1), 110(2), 110(3), 110(4). The host device 105 may then read data from a register having an address "N+1" from the first integrated circuit 110(1) and immediately send another acknowledgment signal (A) to all the integrated circuits 110(1), 110(2), 110(3), 110(4).

The host device 105 may then read data from a register having the address "N" from the second integrated circuit 110(2) and immediately send an acknowledgment signal (A) to all the integrated circuit 110(1), 110(2), 110(3), 110(4). The host device 105 may then read data from a register having the address "N+1" from the second integrated circuit 110(2) and immediately send another acknowledgment signal (A) to all the integrated circuits 110(1), 110(2), 110(3), 110(4).

The host device 105 may then read data from a register having the address "N" from the third integrated circuit 110(3) and immediately send an acknowledgment signal (A) to all the integrated circuit 110(1), 110(2), 110(3), 110(4). The host device 105 may then read data from a register having the address "N+1" from the third integrated circuit 110(3) and immediately send another acknowledgment signal (A).

The host device 105 may then read data from a register having the address "N" from the fourth integrated circuit 110(4) and immediately send an acknowledgment signal (A) to all the integrated circuit 110(1), 110(2), 110(3), 110(4). The host device 105 may then read data from the register having the address "N+1" from the fourth integrated circuit 110(4) and immediately send a non-acknowledgment signal (A-not), which the host device 105 sends to each integrated device 110 to indicate the last data.

The reading transaction may end when the host device 105 generates and sends a stop condition (P) to all the integrated circuits 110.

The reading transaction in the present embodiment doesn't require the host device 105 to use internal register address information to access each integrated circuit individually, which reduces the total number of transferred bytes of data. However, it is assumed that the host device 105 communicates the internal register address information for each integrated circuit 110 prior to starting the reading transaction.

Referring to FIGS. 1 and 3, the host device 105 and the plurality of integrated circuits 110(1), 110(2), 110(3), 110(4) transfer a number of signals, such as data, address, and control signals, between each other. For example, the writing transaction may comprise the start condition (S), which the host device 105 generates and sends to all the integrated circuits, such as the first, second, third, and fourth integrated circuits 110(1), 110(2), 110(3), 110(4).

The writing transaction may further comprise the global slave address signal, which the host device 105 sends to all the integrated circuits, such as the first, second, third, and fourth integrated circuits 110(1), 110(2), 110(3), 110(4). All of the integrated circuits 110(1), 110(2), 110(3), 110(4) recognize the global address signal.

The writing transaction may further comprise a write signal (W-not), which the host device 105 sends to all the integrated circuits 110(1), 110(2), 110(3), 110(4).

The writing transaction may further comprise an acknowledgment signal (A), which each integrated circuit 110 sends to the host device 105 to acknowledge the start condition, the global slave address signal, and the write signal.

The writing transaction may further comprise writing particular data to each integrated circuit 110 in sequence based on the order number stored in the third register 160 of each integrated circuit 110. Accordingly, each integrated circuit 110 responds based on the order number. In an exemplary embodiment, the integrated circuit 110 with the lowest order number (lowest magnitude number) will respond first and the integrated circuit 110 with the highest order number (highest magnitude number) will respond last. The integrated circuits 110 with intermediate order numbers will respond accordingly. For example, the host device 105 may write data to the register having the address "N" from the first integrated circuit 110(1), and the first integrated circuit 110(1) may immediately send an acknowledgment signal (A) to the host device 105. The host device 105 may then write data to the register having the address "N+1" from the first integrated circuit 110(1), and first integrated circuit 110(1) may immediately send another acknowledgment signal (A).

The host device 105 may then write data to the register having the address "N" from the second integrated circuit 110(2), and the second integrated circuit 110(2) may immediately send an acknowledgment signal (A) to the host device 105. The host device 105 may then write data to register having the address "N+1" of the second integrated circuit 110(2), and the second integrated circuit 110(2) may immediately send another acknowledgment signal (A).

The host device 105 may then write data to the register having the address "N" from the third integrated circuit 110(3), and third integrated circuit 110(3) may immediately send an acknowledgment signal (A) to the host device 105. The host device 105 may then write data to the register having the address "N+1" from the third integrated circuit 110(3), and third integrated circuit 110(3) may immediately send another acknowledgment signal (A).

The host device 105 may then write data to the register having the address "N" from the fourth integrated circuit 110(4), and the fourth integrated circuit 110(4) may immediately send an acknowledgment signal (A) to the host device 105. The host device 105 may then write data to register having the address "N+1" from the fourth integrated circuit 110(4), and the fourth integrated circuit 110(4) may immediately send another acknowledgment signal (A).

The writing transaction may end when the host device 105 sends the stop condition (P).

The writing transaction in the present embodiment doesn't require the host device 105 to use internal register address information to access each integrated circuit individually, which reduces the total number of transferred bytes of data. However, it is assumed that the host device 105 communicates the internal register address information for each integrated circuit 110 prior to starting the writing transaction.

According to the present embodiment, the host device 105 and the integrated circuit 110 may transfer a total of 18 bytes of data to perform the reading transaction (FIG. 2) together with the writing transaction (FIG. 3). In contrast, a conventional system (e.g., as illustrated in FIGS. 6 and 7) would be required to transfer 36 bytes of data to read and write the same information as in FIGS. 2 and 3.

Referring to FIGS. 1 and 4, and according to an alternative embodiment, the host device 105 and the plurality of integrated circuits 110(1), 110(2), 110(3), 110(4) transfer a number of signals, such as data, address, and control signals, between each other. For example, the reading transaction may comprise the start condition (S), which the host device 105 sends to all the integrated circuits, such as the first, second, third, and fourth integrated circuits 110(1), 110(2), 110(3), 110(4).

The reading transaction may further comprise the global slave address signal, which the host device 105 sends to all the integrated circuits, such as the first, second, third, and fourth integrated circuits 110(1), 110(2), 110(3), 110(4). The global slave address signal corresponds to the global address stored in the second register 155. Since all of the integrated circuits 110(1), 110(2), 110(3), 110(4) have the same global address, all of the integrated circuits 110(1), 110(2), 110(3), 110(4) recognize the global address signal.

The reading transaction may further comprise the write signal (W-not), which the host device 105 sends to all the integrated circuits 110(1), 110(2), 110(3), 110(4).

The reading transaction may further comprise the acknowledgment signal (A), which each integrated circuit 110 sends to the host device 105 to acknowledge the start condition, the global slave address signal, and the write signal.

The reading transaction may further comprise an internal register address signal, which is common to all the integrated circuits 110(1), 110(2), 110(3), 110(4) and which the host device 105 sends to all the integrated circuits 110(1), 110(2), 110(3), 110(4). Each integrated circuit 110 may then respond to the host device 105 by sending the acknowledgment signal (A). The host device 105 may then send a restart condition (SR) to all the integrated circuits 110(1), 110(2), 110(3), 110(4), the global slave address signal, and then immediately send the read signal (R) to all the integrated circuits 110(1), 110(2), 110(3), 110(4).

The reading transaction may further comprise reading particular data from each integrated circuit 110 in sequence based on the order number stored in the third register 160 of each integrated circuit 110. Accordingly, each integrated circuit 110 responds based on the order number. In an exemplary embodiment, the integrated circuit 110 with the lowest order number will respond first and the integrated circuit with the highest order number will respond last. The integrated circuits 110 with intermediate order numbers will respond accordingly. For example, the host device 105 may read data from the register having the address "N" from the first integrated circuits 110(1) and immediately send an acknowledgment signal (A) to all the integrated circuit 110(1), 110(2), 110(3), 110(4). The host device 105 may then read data from the register having the address "N+1" from the first integrated circuit 110(1) and immediately send another acknowledgment signal (A).

The host device 105 may then read data from the register having the address "N" from the second integrated circuit 110(2) and immediately send an acknowledgment signal (A) to all the integrated circuit 110(1), 110(2), 110(3), 110(4). The host device 105 may then read data from the register having the address "N+1" from the second integrated circuit 110(2) and immediately send another acknowledgment signal (A).

The host device 105 may then read data from the register having the address "N" from the third integrated circuit 110(3) and immediately send an acknowledgment signal (A) to all the integrated circuit 110(1), 110(2), 110(3), 110(4). The host device 105 may then read data from the register having the address "N+1" from the third integrated circuit 110(3) and immediately send another acknowledgment signal (A).

The host device 105 may then read data from the register having the address "N" from the fourth integrated circuit 110(4) and immediately send an acknowledgment signal (A) to all the integrated circuit 110(1), 110(2), 110(3), 110(4). The host device 105 may then read data from the register having the address "N+1" from the fourth integrated circuit 110(4) and immediately send the non-acknowledgment signal (A-not) which the host device 105 sends to each integrated device 110 to indicate the last data.

The reading transaction may end when the host device 105 generates the stop condition (P).

Referring to FIGS. 1 and 5, the host device 105 and the plurality of integrated circuits 110(1), 110(2), 110(3), 110(4) transfer a number of signals, such as data, address, and control signals, between each other. For example, the writing transaction may comprise the start condition (S), which the host device 105 generates and sends to all the integrated circuits, such as the first, second, third, and fourth integrated circuits 110(1), 110(2), 110(3), 110(4).

The writing transaction may further comprise the global slave address signal, which the host device 105 sends to all the integrated circuits, such as the first, second, third, and fourth integrated circuits 110(1), 110(2), 110(3), 110(4). All of the integrated circuits 110(1), 110(2), 110(3), 110(4) recognize the global address signal.

The writing transaction may further comprise a write signal (W-not), which the host device 105 sends to all the integrated circuits 110(1), 110(2), 110(3), 110(4).

The writing transaction may further comprise an acknowledgment signal (A), which each integrated circuit 110 sends to the host device 105 to acknowledge the start condition, the global slave address signal, and the write signal.

The writing transaction may further comprise the internal register address signal, which the host device 105 sends to all the integrated circuits 110(1), 110(2), 110(3), 110(4). The integrated circuits 110(1), 110(2), 110(3), 110(4) may then respond by sending the acknowledgment signal (A) to the host device 105.

The writing transaction may further comprise writing particular data to each integrated circuit 110 in sequence based on the order number stored in the third register 160 of each integrated circuit 110. Accordingly, each integrated circuit 110 responds based on the order number. In an exemplary embodiment, the integrated circuit 110 with the lowest order number (lowest magnitude number) will respond first and the integrated circuit with the highest order number (highest magnitude number) will respond last. The integrated circuits 110 with intermediate order numbers will respond accordingly.

For example, the host device 105 may write data to the register with the address "N" from the first integrated circuit 110(1), and the first integrated circuit 110(1) may immediately send an acknowledgment signal (A) to the host device 105. The host device 105 may then write data to the register having the address "N+1" from the first integrated circuit 110(1), and first integrated circuit 110(1) may immediately send another acknowledgment signal (A).

The host device 105 may then write data to the register having the address "N" from the second integrated circuit 110(2), and the second integrated circuit 110(2) may immediately send an acknowledgment signal (A) to the host device 105. The host device 105 may then write data to the register having the address "N+1" from the second integrated circuit 110(2) and the second integrated circuit 110(2) may immediately send another acknowledgment signal (A).

The host device 105 may then write data to the register having the address "N" from the third integrated circuits 110(3), and third integrated circuit 110(3) may immediately send an acknowledgment signal (A) to the host device 105. The host device 105 may then write data to the register having address "N+1" from the third integrated circuit 110(3) and third integrated circuit 110(3) may immediately send another acknowledgment signal (A).

The host device 105 may then write data to the register having the address "N" from the fourth integrated circuit 110(4), and the fourth integrated circuit 110(4) may immediately send an acknowledgment signal (A) to the host device 105. The host device 105 may then write data to the register having the address "N+1" from the fourth integrated circuit 110(4), and the fourth integrated circuit 110(4) may immediately send another acknowledgment signal (A).

The writing transaction may end when the host device 105 generates and sends the stop condition (P) to all the integrated circuits 110(1), 110(2), 110(3), 110(4).

According to the present embodiment, the host device 105 and the integrated circuits 110(1), 110(2), 110(3), 110(4) may transfer a total of 21 bytes of data to perform the reading transaction (FIG. 4) together with the writing transaction (FIG. 5). In contrast, a conventional system (e.g., as illustrated in FIGS. 6 and 7) would be required to transfer 36 bytes of data to read and write the same information as in FIGS. 4 and 5.

In the foregoing description, the technology has been described with reference to specific exemplary embodiments. The particular implementations shown and described are illustrative of the technology and its best mode and are not intended to otherwise limit the scope of the present technology in any way. Indeed, for the sake of brevity, conventional manufacturing, connection, preparation, and other functional aspects of the method and system may not be described in detail. Furthermore, the connecting lines shown in the various figures are intended to represent exemplary functional relationships and/or steps between the various elements. Many alternative or additional functional relationships or physical connections may be present in a practical system.

The technology has been described with reference to specific exemplary embodiments. Various modifications and changes, however, may be made without departing from the scope of the present technology. The description and figures are to be regarded in an illustrative manner, rather than a restrictive one and all such modifications are intended to be included within the scope of the present technology. Accordingly, the scope of the technology should be determined by the generic embodiments described and their legal equivalents rather than by merely the specific examples described above. For example, the steps recited in any method or process embodiment may be executed in any order, unless otherwise expressly specified, and are not limited to the explicit order presented in the specific examples. Additionally, the components and/or elements recited in any apparatus embodiment may be assembled or otherwise operationally configured in a variety of permutations to produce substantially the same result as the present technology and are accordingly not limited to the specific configuration recited in the specific examples.

Benefits, other advantages and solutions to problems have been described above with regard to particular embodiments. Any benefit, advantage, solution to problems or any element that may cause any particular benefit, advantage or solution to occur or to become more pronounced, however, is not to be construed as a critical, required or essential feature or component.

The terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present technology, in addition to those not specifically recited, may be varied or otherwise particularly adapted to specific environments, manufacturing specifications, design parameters or other operating requirements without departing from the general principles of the same.

The present technology has been described above with reference to an exemplary embodiment. However, changes and modifications may be made to the exemplary embodiment without departing from the scope of the present technology. These and other changes or modifications are intended to be included within the scope of the present technology, as expressed in the following claims.

The invention claimed is:

1. A system, comprising:

a host device;

a first integrated circuit connected to the host device via a common bus, wherein the first integrated circuit is capable of connecting to a second integrated circuit via the common bus, and wherein the first integrated circuit comprises:

a first I/O terminal adapted to receive and transmit a data signal;

a second I/O terminal adapted to receive a clock signal;

an interface circuit connected to the first and second I/O terminals;

a first register in communication with the interface circuit and configured to store a global address, wherein the global address is common to the first integrated circuit and the second integrated circuit;

a second register in communication with the interface circuit and configured to store a first unique address, wherein the first unique address is exclusive to the first integrated circuit;

a third register in communication with the interface circuit and configured to store a first order number, wherein the first order number is exclusive to the first integrated circuit; and a fourth register configured to store data, wherein the fourth register is associated solely with an internal register address;

wherein the host device transmits the global address and the internal register address to the first integrated circuit to read from and write to the fourth register.

2. The system according to claim 1, wherein the first integrated circuit further comprises:

a location sensor; and the fourth register is configured to store location data from the location sensor.

3. The system according to claim 1, wherein the second integrated circuit comprises:

a third I/O terminal adapted to receive and transmit the data signal;

a fourth I/O terminal adapted to receive the clock signal;

a second interface circuit connected to the third and fourth I/O terminals;

a sixth register in communication with the second interface circuit and configured to store the global address;

a seventh register in communication with the second interface circuit and configured to store a second unique address, wherein the second unique address is exclusive to the second integrated circuit; and an eighth register in communication with the second interface circuit and configured to store a second order number, wherein the second order number is exclusive to the second integrated circuit.

4. The system according to claim 1, wherein the first integrated circuit further comprises an actuator driver circuit.

5. The system according to claim 4, wherein the first integrated circuit further comprises a fifth register configured to store actuator data from the actuator driver.

6. The system according to claim 1, wherein the first integrated circuit further comprises a non-volatile memory in communication with the interface circuit.

7. The system according to claim 1, wherein the first integrated circuit and the second integrated circuit are capable of being accessed by the host device, wherein the host device writes data to the first and second integrated circuits using the global address and the internal register address.

8. The system according to claim 1, wherein the first and second integrated circuits are capable of being accessed by the host device, and the host device reads data from the first and second integrated circuits using the global address and the internal register address.

9. A method for communication between a host device and a plurality of slave devices, comprising:

simultaneously transmitting a global address from the host device to each slave device, wherein the global address is shared by all slave devices;

simultaneously transmitting an internal register address from the host device to each slave device, wherein each slave device comprises a register that is associated solely with the internal register address;

writing data to the register having the internal register address; and reading data from the register having the internal register address;

wherein:

a first slave device, from the plurality of slave devices, is configured to store:

the global address;

a first unique address, wherein the first unique address is exclusive to the first slave device;

a first order number, wherein the first order number is exclusive to the first slave device; and a second slave device, from the plurality of slave devices, is configured to store:

the global address;

a second unique address, wherein the second unique address is exclusive to the second slave device;

a second order number, wherein the second order number is exclusive to the second slave device.

10. The method according to claim 9, wherein writing data to each slave device comprises:

writing data to first slave device first in time; and writing data to the second slave device second in time.

11. The method according to claim 9, wherein reading data from each slave device comprises:

reading data from the first slave device first in time; and reading data from the second slave device second in time.

12. The method according to claim 9, wherein:

each slave device recognizes the global address simultaneously;

each slave device recognizes the internal register address simultaneously;

the first slave device responds to the global address first in time; and the second slave device responds to the global address second in time.

13. The method according to claim 9, wherein each slave device responds to writing data and reading data in sequence according to the respective order number.

14. A system, comprising:

a host device; and a plurality of driver integrated circuits connected to the host device via a common bus, comprising:

a first driver integrated circuit, comprising:

a first pair of I/O terminals;

a first interface circuit connected to the first pair of I/O terminals; and a first plurality of registers, comprising:

a first register to store a global address;

a second register to store a first unique address, wherein the first unique address is exclusive to the first driver integrated circuit;

a third register to store a first order number, wherein the first order number is exclusive to the first driver integrated circuit; and a fourth register to store data, wherein the fourth register is associated solely with an internal register address; and a second driver integrated circuit, comprising:

a second pair of I/O terminals;

a second interface circuit connected to the first pair of I/O terminals; and a second plurality of registers, comprising:

a fifth register to store the global address;

a sixth register to store a second unique address, wherein the second unique address is exclusive to the second driver integrated circuit;

a seventh register to store a second order number, wherein the second order number is exclusive to the second driver integrated circuit; and an eighth register to store data, wherein the eighth register is associated solely with the internal register address.

15. The system according to claim 14, wherein the host device is capable of writing data to the first and second driver integrated circuits by transmitting the global address and the internal register address only one time.

16. The system according to claim 15, wherein the data is written to first driver integrated circuit first in time and the data is written to the second driver integrated circuit second in time.

17. The system according to claim 14, wherein the host device is capable of reading data from the first and second driver integrated circuits by transmitting the global address and the internal register address only one time.

18. The system according to claim 17, wherein the data is read from the first driver integrated circuit first in time and the data is read from the second driver integrated circuit second in time.

19. The system according to claim 14, wherein the host device communicates with the first and second driver integrated circuits according to the respective order number, wherein the first driver integrated circuit is first in time and the second driver integrated circuit is second in time.

20. The system according to claim 14, wherein:

the first driver integrated circuit further comprises a first non-volatile memory in communication with the first interface circuit; and the second driver integrated further comprises a second non-volatile memory in communication with the second interface circuit.

* * * * *